United States Patent
Anderson

(10) Patent No.: US 9,188,980 B2
(45) Date of Patent: Nov. 17, 2015

(54) VEHICLE WITH HIGH INTEGRITY PERCEPTION SYSTEM

(75) Inventor: Noel Wayne Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 1846 days.

(21) Appl. No.: 12/208,851

(22) Filed: Sep. 11, 2008

(65) Prior Publication Data

US 2010/0063672 A1    Mar. 11, 2010

(51) Int. Cl.
*G08G 1/123* (2006.01)
*G05D 1/00* (2006.01)

(52) U.S. Cl.
CPC ...... *G05D 1/0077* (2013.01); *G05D 2201/0201* (2013.01)

(58) Field of Classification Search
USPC ........... 701/25, 400, 408, 409, 454, 461, 462, 701/29.1, 29.2, 29.7, 450, 463, 532; 700/245; 455/456.1, 411
See application file for complete search history.

(56) References Cited

U.S. PATENT DOCUMENTS

| | | | |
|---|---|---|---|
| 4,166,349 A | 9/1979 | Coenenberg et al. |
| 5,334,986 A | 8/1994 | Fernhout |
| 5,416,310 A | 5/1995 | Little |
| 5,572,401 A | 11/1996 | Carroll |
| 5,615,116 A | 3/1997 | Gudat et al. |
| 5,632,044 A | 5/1997 | Sloot |
| 5,684,476 A | 11/1997 | Anderson |
| 5,684,696 A | 11/1997 | Rao et al. |
| 5,734,932 A | 3/1998 | Washisu |
| 5,892,445 A | 4/1999 | Tomich |
| 5,911,669 A | 6/1999 | Stentz et al. |
| 6,032,097 A | 2/2000 | Iihoshi et al. |
| 6,038,502 A | 3/2000 | Sudo |
| 6,101,795 A | 8/2000 | Diekhans |
| 6,108,197 A | 8/2000 | Janik |
| 6,128,559 A | 10/2000 | Saitou et al. |
| 6,163,277 A | 12/2000 | Gehlot |
| 6,191,813 B1 | 2/2001 | Fujisaki et al. |
| 6,246,932 B1 | 6/2001 | Kageyama et al. |

(Continued)

FOREIGN PATENT DOCUMENTS

| | | |
|---|---|---|
| CA | 2305606 A1 | 10/2000 |
| DE | 102006017540 A1 | 10/2007 |

(Continued)

OTHER PUBLICATIONS

U.S. Appl. No. 12/208,752, filed Sep. 11, 2008, Toldstedt et al.

(Continued)

*Primary Examiner* — Ronnie Mancho
(74) *Attorney, Agent, or Firm* — Yee & Associates, P.C.

(57) ABSTRACT

The illustrative embodiments provide an apparatus for processing sensor data and controlling the movement of a vehicle. In an illustrative embodiment, an operating environment around the vehicle is identified and sensor data is selected from a set of sensors. The movement of the vehicle is controlled based on the operating environment identified. In another illustrative embodiment, a sensor system has some sensors that are more accurate in a particular environment than other sensors. A dynamic condition is identified by the sensor system and commands are sent to the steering system, the propulsion system, and the braking system to move the vehicle using the sensor data detected by the sensor system. The environment is identified using the plurality of different types of sensors on the vehicle.

24 Claims, 9 Drawing Sheets

(56) References Cited

U.S. PATENT DOCUMENTS

| | | |
|---|---|---|
| 6,275,283 B1 | 8/2001 | Hasson |
| 6,313,454 B1 | 11/2001 | Bos et al. |
| 6,324,586 B1 | 11/2001 | Johnson |
| 6,356,820 B1 | 3/2002 | Hashimoto et al. |
| 6,434,622 B1 | 8/2002 | Monteiro et al. |
| 6,457,024 B1 | 9/2002 | Felsentein et al. |
| 6,507,486 B2 | 1/2003 | Peterson, III |
| 6,529,372 B1 | 3/2003 | Ng et al. |
| 6,552,661 B1 | 4/2003 | Lastinger et al. |
| 6,581,571 B2 | 6/2003 | Kubesh et al. |
| 6,584,390 B2 | 6/2003 | Beck |
| 6,615,570 B2 | 9/2003 | Beck et al. |
| 6,650,242 B2 | 11/2003 | Clerk et al. |
| 6,678,580 B2 | 1/2004 | Benneweis |
| 6,694,260 B1 | 2/2004 | Rekow |
| 6,708,080 B2 | 3/2004 | Benneweis |
| 6,728,608 B2 | 4/2004 | Ollis et al. |
| 6,732,024 B2 | 5/2004 | Rekow et al. |
| 6,760,654 B2 | 7/2004 | Beck |
| 6,839,127 B1 | 1/2005 | Anderson |
| 6,859,729 B2 | 2/2005 | Breakfield et al. |
| 6,882,897 B1 | 4/2005 | Fernandez |
| 6,898,501 B2 | 5/2005 | Schubert |
| 6,917,300 B2 | 7/2005 | Allen |
| 6,943,824 B2 | 9/2005 | Alexia et al. |
| 7,064,810 B2 | 6/2006 | Anderson et al. |
| 7,088,252 B2 | 8/2006 | Weekes |
| 7,164,118 B2 | 1/2007 | Anderson et al. |
| 7,167,797 B2 | 1/2007 | Faivre et al. |
| 7,222,004 B2 | 5/2007 | Anderson |
| 7,265,970 B2 | 9/2007 | Jordan |
| 7,266,477 B2 | 9/2007 | Foessel |
| 7,286,934 B2 | 10/2007 | Gaegauf et al. |
| 7,299,056 B2 | 11/2007 | Anderson |
| 7,299,057 B2 | 11/2007 | Anderson |
| 7,313,404 B2 | 12/2007 | Anderson |
| 7,317,977 B2 | 1/2008 | Matrosov |
| 7,317,988 B2 | 1/2008 | Johnson |
| 7,330,117 B2 | 2/2008 | Ferguson et al. |
| 7,375,627 B2 | 5/2008 | Johnson et al. |
| 7,382,274 B1 | 6/2008 | Kermani et al. |
| 7,400,976 B2 | 7/2008 | Young et al. |
| 7,474,945 B2 | 1/2009 | Matsunaga |
| 7,499,776 B2 | 3/2009 | Allard et al. |
| 7,545,286 B2 | 6/2009 | Yanase |
| 7,561,948 B2 | 7/2009 | Gaegauf et al. |
| 7,579,939 B2 | 8/2009 | Schofield et al. |
| 7,610,125 B2 | 10/2009 | Fitzner et al. |
| 7,623,951 B2 | 11/2009 | Congdon et al. |
| 7,668,621 B2 | 2/2010 | Bruemmer |
| 7,693,624 B2 | 4/2010 | Duggan et al. |
| 7,719,410 B2 | 5/2010 | Labuhn et al. |
| 7,725,261 B2 | 5/2010 | Sekiguchi |
| 7,734,419 B2 | 6/2010 | Kondoh |
| 7,742,864 B2 | 6/2010 | Sekiguchi |
| 7,751,945 B2 | 7/2010 | Obata |
| 7,818,090 B2 | 10/2010 | Okamoto |
| 7,852,233 B2 | 12/2010 | Cemper |
| 7,894,982 B2 | 2/2011 | Reeser et al. |
| 7,899,584 B2 | 3/2011 | Schricker |
| 7,916,898 B2 | 3/2011 | Anderson |
| 7,930,056 B2 | 4/2011 | Fernandez |
| 8,020,657 B2 | 9/2011 | Allard et al. |
| 8,031,085 B1 | 10/2011 | Anderson |
| 8,072,309 B2 | 12/2011 | Kraimer et al. |
| 8,108,098 B2 | 1/2012 | Childress et al. |
| 8,131,432 B2 | 3/2012 | Senneff et al. |
| 8,139,108 B2 | 3/2012 | Stratton et al. |
| 8,140,658 B1 | 3/2012 | Gelvin et al. |
| 8,175,785 B2 | 5/2012 | Turski et al. |
| 8,190,331 B2 | 5/2012 | Browne et al. |
| 8,195,342 B2 | 6/2012 | Anderson |
| 8,195,358 B2 | 6/2012 | Anderson |
| 8,200,428 B2 | 6/2012 | Anderson |
| 8,205,849 B2 | 6/2012 | Shimizu |
| 8,224,500 B2 | 7/2012 | Anderson |
| 8,229,618 B2 | 7/2012 | Tolstedt et al. |
| 8,253,586 B1 | 8/2012 | Matak |
| 8,255,144 B2 | 8/2012 | Breed et al. |
| 8,392,065 B2 | 3/2013 | Tolstedt et al. |
| 8,467,928 B2 | 6/2013 | Anderson |
| 8,467,943 B2 | 6/2013 | Dersjoe et al. |
| 8,560,145 B2 | 10/2013 | Anderson |
| 8,666,587 B2 | 3/2014 | Anderson |
| 8,818,567 B2 | 8/2014 | Anderson |
| 8,989,972 B2 | 3/2015 | Anderson |
| 9,026,315 B2 | 5/2015 | Anderson |
| 2001/0045978 A1 | 11/2001 | McConnell et al. |
| 2002/0059320 A1 | 5/2002 | Tamaru |
| 2002/0156556 A1 | 10/2002 | Ruffner |
| 2003/0186712 A1 | 10/2003 | Tillotson |
| 2004/0078137 A1 | 4/2004 | Breakfield et al. |
| 2005/0088643 A1 | 4/2005 | Anderson |
| 2005/0275542 A1 | 12/2005 | Weekes |
| 2006/0106496 A1 | 5/2006 | Okamoto |
| 2006/0173593 A1 | 8/2006 | Anderson |
| 2006/0180647 A1 | 8/2006 | Hansen |
| 2006/0189324 A1* | 8/2006 | Anderson ............... 455/456.1 |
| 2006/0221328 A1 | 10/2006 | Rouly |
| 2007/0129869 A1 | 6/2007 | Gudat et al. |
| 2007/0168090 A1 | 7/2007 | DeMarco et al. |
| 2007/0171037 A1* | 7/2007 | Schofield et al. ............ 340/438 |
| 2007/0193798 A1 | 8/2007 | Allard et al. |
| 2007/0198144 A1 | 8/2007 | Norris et al. |
| 2008/0009970 A1 | 1/2008 | Bruemmer |
| 2008/0129445 A1 | 6/2008 | Kraimer et al. |
| 2008/0167781 A1 | 7/2008 | Labuhn et al. |
| 2009/0018712 A1 | 1/2009 | Duncan et al. |
| 2009/0079839 A1 | 3/2009 | Fischer et al. |
| 2009/0216406 A1 | 8/2009 | Senneff et al. |
| 2009/0221328 A1 | 9/2009 | Schumacher et al. |
| 2009/0259399 A1 | 10/2009 | Kotejoshyer et al. |
| 2009/0266946 A1 | 10/2009 | Shimizu |
| 2009/0268946 A1 | 10/2009 | Zhang et al. |
| 2009/0299581 A1 | 12/2009 | Price |
| 2010/0036546 A1 | 2/2010 | Gomes et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063652 A1 | 3/2010 | Anderson |
| 2010/0063663 A1 | 3/2010 | Tolstedt et al. |
| 2010/0063664 A1 | 3/2010 | Anderson |
| 2010/0063673 A1 | 3/2010 | Anderson |
| 2010/0063680 A1 | 3/2010 | Tolstedt et al. |
| 2010/0063954 A1 | 3/2010 | Anderson |
| 2010/0081411 A1 | 4/2010 | Montenero |
| 2010/0131122 A1 | 5/2010 | Dersjo et al. |
| 2010/0179691 A1 | 7/2010 | Gal et al. |
| 2010/0289662 A1 | 11/2010 | Dasilva et al. |
| 2010/0332061 A1 | 12/2010 | Forslow et al. |
| 2011/0021231 A1 | 1/2011 | Burns et al. |
| 2011/0254708 A1 | 10/2011 | Anderson |
| 2012/0029761 A1 | 2/2012 | Anderson |
| 2012/0095651 A1 | 4/2012 | Anderson |
| 2012/0221172 A1 | 8/2012 | Anderson |
| 2012/0277932 A1 | 11/2012 | Anderson |
| 2013/0282200 A1 | 10/2013 | Anderson |
| 2015/0025708 A1 | 1/2015 | Anderson |

FOREIGN PATENT DOCUMENTS

| | | |
|---|---|---|
| JP | 7159285 A | 6/1995 |
| WO | WO2007051972 A1 | 5/2007 |
| WO | WO2008133394 A1 | 11/2008 |

OTHER PUBLICATIONS

U.S. Appl. No. 12/208,782, filed Sep. 11, 2008, Anderson.
U.S. Appl. No. 12/208,691, filed Sep. 11, 2008, Anderson.
U.S. Appl. No. 12/208,659, filed Sep. 11, 2008, Toldstedt et al.
U.S. Appl. No. 12/208,666, filed Sep. 11, 2008, Anderson.
U.S. Appl. No. 12/208,721, filed Sep. 11, 2008, Anderson.
U.S. Appl. No. 12/208,885, filed Sep. 11, 2008, Anderson.

(56) References Cited

OTHER PUBLICATIONS

U.S. Appl. No. 12/208,710, filed Sep. 11, 2008, Anderson.
Borenstein et al., "Where am I?"—Systems and Methods for Mobile Robot Positioning, Mar. 1996, pp. 1-281 http://www-personal.umich.edu/-johannb/shared/pos96rep.pdf.
Qishi Wu, "On Optimal Deployment of Probabilistic Detectors in the Plane", abstract—1 page, retrieved Oct. 13, 2009 http://bit.csc.lsu.edu/news/news200204102.html.
Deans et al., "Localization and Mapping using Bearings Only Sensors", retrieved Oct. 13, 2009 pp. 1-3 http://www.cs.cmu.edu/~rl1/guide2001/deans/html/deans.html.
"Computers and Software", Capitalist Lion, pp. 1-7, retrieved Oct. 13, 2009, http://capitalistlion.com/essays/vid-platforms.html.
Yao, "Video Stabilization", retrieved Oct. 13, 2009, pp. 1-2 http://www.cfar.umd.edu/~yao/video_stabilization.html.
Kelly, "Precision Dilution in Triangulation Based Mobile Robot Position Estimation", pp. 1-8, retrieved Oct. 13, 2009 http://www.frc.ri.cmu.edu/~alonzo/pubs/papers/ias8.pdf.
Willemsen, "Marine Navigation Courses: Lines of Position, Position Fixes: 4 Plotting and Piloting", pp. 1-12, retrieved Oct. 13, 2009 http://www.sailingissues.com/navcourse4.html.
"FleetSubmarine.com", retrieved Oct. 13, 2009 pp. 1-14 http://fleetsubmarine.com/periscope.html.
USPTO Office Action date Jul. 20, 2011 for U.S. Appl. No. 12/208,710.
Extended European Search Report, dated Apr. 10, 2014, regarding Application No. EP09176819.2, 8 pages.
Extended European Search Report, dated Oct. 10, 2014, regarding Application No. EP09168308.6, 6 pages.
Gao, "Optimal Adaptive Routing and Traffic Assignment in Stochastic Time-Dependent Networks," Thesis, Doctor of Philosophy in Transportation, Massachusetts Institute of Technology, Feb. 2005, 237 pages.
Hagras et al., "Online Learning of the Sensors Fuzzy Membership Functions in Autonomous Mobile Robots," Proceedings of the 2000 IEEE International Conference on Robotics and Automation, Apr. 2000, pp. 3233-3238.
Kiriy, "A Localization System for Autonomous Golf Course Mowers," Masters Thesis, McGill University, Montreal, Canada, Nov. 2002, 122 pages.
Najjaran et al., "Online Map Building for Terrain Scanning Robots Using a Hybrid Neurofuzzy Kalman Filter," 2004 Annual Meeting of the North American Fuzzy Information Processing Society, Jun. 2004, vol. 2, pp. 814-819.
Stella et al., "Self-Location of a Mobile Robot with Uncertainty by Cooperation of a Heading Sensor and a CCD TV Camera," Proceedings of the 13th International Conference on Pattern Recognition, Aug. 1996, vol. 3, pp. 303-307.
Zappi et al., "Activity recognition from on-body sensors by classifier fusion: sensor scalability and robustness," Proceedings of the 3rd International Conference on Intelligent Sensors, Sensor Networks and Information (ISSNIP 2007), Dec. 2007, pp. 281-286.

\* cited by examiner

FIG. 1
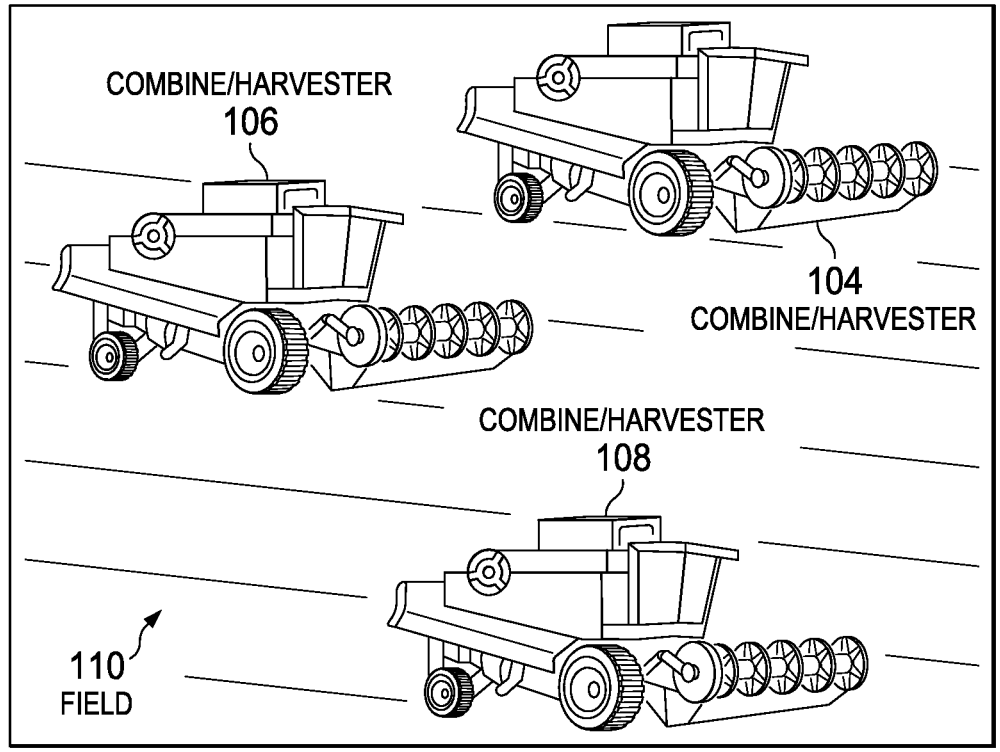
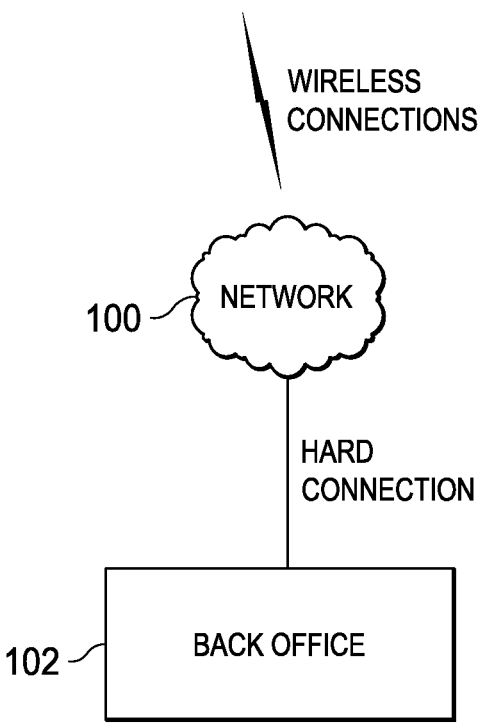

FIG. 8

SENSOR TABLE 800

| | NORMAL OPERATING CONDITIONS 804 | EARLY FALL 808 | WINTER 812 | NOTES |
|---|---|---|---|---|
| GPS 802 | GOOD TO POOR QUALITY SIGNAL RECEPTION 806 | GOOD TO POOR QUALITY SIGNAL RECEPTION 810 | GOOD TO VERY GOOD SIGNAL RECEPTION 814 | USE AS SEED FOR MAP MATCHING |
| VISIBLE CAMERA IMAGES OF A CURB OR STREET EDGE 816 | EXCELLENT QUALITY IMAGES 818 | UNUSABLE QUALITY IMAGES 820 | UNUSABLE QUALITY IMAGES 822 | |
| VISIBLE CAMERA IMAGES (8 FT. UP) 824 | EXCELLENT QUALITY IMAGES 826 | EXCELLENT QUALITY IMAGES 828 | GOOD TO EXCELLENT QUALITY IMAGES 830 | |
| VISIBLE CAMERA IMAGES OF THE STREET CROWN 832 | GOOD QUALITY IMAGES 834 | GOOD TO POOR QUALITY IMAGES 836 | UNUSABLE QUALITY IMAGES 838 | |
| LIDAR IMAGES OF A CURB 840 | EXCELLENT 842 | UNUSABLE 844 | UNUSABLE 844 | |
| LIDAR (8 FT. UP) 846 | EXCELLENT 848 | EXCELLENT 848 | EXCELLENT 848 | |
| LIDAR (SKY) 850 | UNUSABLE DUE TO CANOPY 852 | UNUSABLE TO POOR 854 | EXCELLENT 856 | |

VEHICLE WITH HIGH INTEGRITY PERCEPTION SYSTEM

CROSS REFERENCE TO RELATED APPLICATIONS

This application is related to commonly assigned and co-pending U.S. patent application Ser. No. 12/208,752 entitled "Leader-Follower Semi-Autonomous Vehicle with Operator on Side"; U.S. patent application Ser. No. 12/208,659 entitled "Leader-Follower Fully-Autonomous Vehicle with Operator on Side"; U.S. patent application Ser. No. 12/208,691 entitled "High Integrity Perception for Machine Localization and Safeguarding"; U.S. patent application Ser. No. 12/208,666 entitled "Distributed Knowledge Base For Vehicular Localization And Work-Site Management"; U.S. patent application Ser. No. 12/208,782 entitled "Distributed Knowledge Base Method For Vehicular Localization And Work-Site Management"; U.S. patent application Ser. No. 12/208,721 entitled "Distributed Knowledge Base Program For Vehicular Localization and Work-Site Management"; U.S. patent application Ser. No. 12/208,885 entitled "Multi-Vehicle High Integrity Perception"; and U.S. patent application Ser. No. 12/208,710 entitled "High Integrity Perception Program" all of which are hereby incorporated by reference.

FIELD OF THE INVENTION

The present disclosure relates generally to systems and methods for vehicle navigation and more particularly systems and methods for high integrity perception for controlling operation of a vehicle. As an example, embodiments of this invention provide a method and system utilizing a versatile robotic control module for localization and navigation of a vehicle.

BACKGROUND OF THE INVENTION

An increasing trend towards developing automated or semi-automated equipment is present in today's work environment. In some situations with the trend, this equipment is completely different from the operator-controlled equipment that is being replaced, and does not allow for any situations in which an operator can be present or take over operation of the vehicle. Such unmanned equipment can be unreliable due to the complexity of systems involved, the current status of computerized control, and uncertainty in various operating environments. As a result, semi-automated equipment is more commonly used. This type of equipment is similar to previous operator-controlled equipment, but incorporates one or more operations that are automated rather than operator-controlled. This semi-automated equipment allows for human supervision and allows the operator to take control when necessary.

SUMMARY

The illustrative embodiments provide an apparatus for processing sensor data and controlling the movement of a vehicle. In an illustrative embodiment, an operating environment around the vehicle is identified and sensor data is selected from a set of sensors. The movement of the vehicle is controlled based on the operating environment identified. In another illustrative embodiment, a sensor system has some sensors that are more accurate in a particular environment than other sensors. A dynamic condition is identified by the sensor system and commands are sent to the steering system, the propulsion system, and the braking system to move the vehicle using the sensor data detected by the sensor system. The environment is identified using the plurality of different types of sensors on the vehicle.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of multiple vehicles operating in a network environment in accordance with an illustrative embodiment;

FIG. 8 is a block diagram of a sensor selection table in a knowledge base used to select sensors for use in planning paths and obstacle avoidance in accordance with an illustrative embodiment;

DESCRIPTION OF THE PREFERRED EMBODIMENT

Figure 2A:
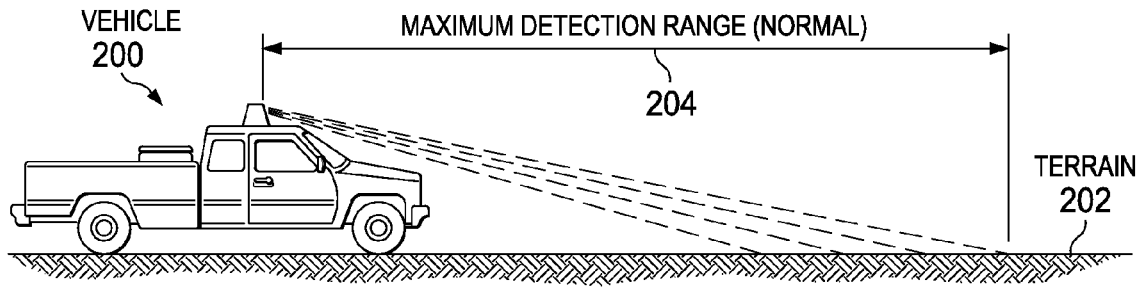
FIGS. 2A and 2B are a block diagram illustrating vehicle perception used to adjust navigation in accordance with an illustrative embodiment.

Embodiments of this invention provide systems and methods for vehicle navigation and more particularly systems and methods for a distributed knowledge base within a vehicle for controlling operation of a vehicle. As an example, embodiments of this invention provide a method and system for utilizing a versatile robotic control module for localization and navigation of a vehicle.

Robotic or autonomous vehicles, sometimes referred to as mobile robotic platforms, generally have a robotic control system that controls the operational systems of the vehicle. In a vehicle that is limited to a transportation function, the operational systems may include steering, braking, transmission, and throttle systems. Such autonomous vehicles generally have a centralized robotic control system for control of the operational systems of the vehicle. Some military vehicles have been adapted for autonomous operation. In the United States, some tanks, personnel carriers, Stryker vehicles, and other vehicles have been adapted for autonomous capability. Generally, these are to be used in a manned mode as well.

The different illustrative embodiments recognize that robotic control system sensor inputs may include data associated with the vehicle's destination, preprogrammed path information, and detected obstacle information. Based on such data associated with the information above, the vehicle's movements are controlled. Obstacle detection systems within a vehicle commonly use scanning lasers to scan a beam over a field of view, or cameras to capture images over a field of view. The scanning laser may cycle through an entire range of beam orientations, or provide random access to any particular orientation of the scanning beam. The camera or cameras may capture images over the broad field of view, or of a particular spectrum within the field of view. For obstacle detection applications of a vehicle, the response time for collecting image data should be rapid over a wide field of view to facilitate early recognition and avoidance of obstacles.

Location sensing devices include odometers, global positioning systems, and vision-based triangulation systems. Many location sensing devices are subject to errors in providing an accurate location estimate over time and in different geographic positions. Odometers are subject to material errors due to surface terrain. Satellite-based guidance systems, such as global positioning system-based guidance systems, which are commonly used today as a navigation aid in cars, airplanes, ships, computer-controlled harvesters, mine trucks, and other vehicles, may experience difficulty guiding when heavy foliage or other permanent obstructions, such as mountains, buildings, trees, and terrain, prevent or inhibit global positioning system signals from being accurately received by the system. Vision-based triangulation systems may experience error over certain angular ranges and distance ranges because of the relative position of cameras and landmarks.

The illustrative embodiments also recognize that in order to provide a system and method where a combination manned/autonomous vehicle accurately navigates and manages a work-site, specific mechanical accommodations for processing means and location sensing devices are required. Therefore, it would be advantageous to have a method and apparatus to provide additional features for the navigation of vehicles.

With reference to the figures and in particular with reference to FIG. 1, embodiments of the present invention may be used in a variety of vehicles, such as automobiles, trucks, harvesters, combines, agricultural equipment, tractors, mowers, armored vehicles, and utility vehicles. Embodiments of the present invention may also be used in a single computing system or a distributed computing system. The illustrative embodiments are not meant to limit the present invention in any way. FIG. 1 depicts a block diagram of multiple vehicles operating in a network environment in accordance with an illustrative embodiment. FIG. 1 depicts an illustrative environment including network 100 in one embodiment of the present invention. In this example, back office 102 may be a single computer or a distributed computing cloud. Back office 102 supports the physical databases and/or connections to external databases which underlie the knowledge bases used in the different illustrative embodiments. Back office 102 may supply knowledge bases to different vehicles, as well as provide online access to information from knowledge bases. In this example, combine/harvesters 104, 106, and 108 may be any type of harvesting, threshing, crop cleaning, or other agricultural vehicle. In this illustrative embodiment, combine/harvesters 104, 106, and 108 operate on field 110, which may be any type of land used to cultivate crops for agricultural purposes.

In an illustrative example, combine/harvester 104 may move along field 110 following a leader using a number of different modes of operation to aid an operator in performing agricultural tasks on field 110. The modes include, for example, a side following mode, a teach and playback mode, a teleoperation mode, a path mapping mode, a straight mode, and other suitable modes of operation. An operator may be a person being followed as the leader when the vehicle is operating in a side-following mode, a person driving the vehicle, or a person controlling the vehicle movements in teleoperation mode. A leader may be a human operator or another vehicle in the same worksite.

In one example, in the side following mode, combine/harvester 106 is the leader and combine/harvesters 104 and 108 are the followers. In another example, in the side following mode an operator may be the leader and combine/harvester 104 may be the follower. The side following mode may include preprogrammed maneuvers in which an operator may change the movement of combine/harvester 104 from an otherwise straight travel path for combine/harvester 104. For example, if an obstacle is detected in field 110, the operator may initiate a go around obstacle maneuver that causes combine/harvester 104 to steer out and around an obstacle in a preset path. With this mode, automatic obstacle identification and avoidance features may still be used. With the teach and play back mode, for example, an operator may drive combine/harvester 104 along a path on field 110 without stops, generating a mapped path. After driving the path, the operator may move combine/harvester 104 back to the beginning of the mapped path. In the second pass on field 110, the operator may cause combine/harvester 104 to drive the mapped path from start point to end point without stopping, or may cause combine/harvester 104 to drive the mapped path with stops along the mapped path. In this manner, combine/harvester 104 drives from start to finish along the mapped path. Combine/harvester 104 still may include some level of obstacle detection to prevent combine/harvester 104 from running over or hitting an obstacle, such as a field worker or another agricultural vehicle, such as combine/harvester 106 and 108.

In a teleoperation mode, for example, an operator may operate and/or wirelessly drive combine/harvester 104 across field 110 in a fashion similar to other remote controlled vehicles. With this type of mode of operation, the operator may control combine/harvester 104 through a wireless controller.

In a path mapping mode, the different paths may be mapped by an operator prior to reaching field 110. In a crop spraying example, routes may be identical for each trip and the operator may rely on the fact that combine/harvester 104 will move along the same path each time. Intervention or deviation from the mapped path may occur only when an obstacle is present. Again, with the path mapping mode, way points may be set to allow combine/harvester 104 to stop or turn at certain points along field 110.

In a straight mode, combine/harvester 106 may be placed in the middle or offset from some distance from a boundary, field edge, or other vehicle on field 110. In a grain harvesting example, combine/harvester 106 may move down field 110 along a straight line allowing one or more other vehicles, such as combine/harvester 104 and 108, to travel in a parallel path on either side of combine/harvester 106 to harvest rows of grain. In this type of mode of operation, the path of combine/harvester 106 is always straight unless an obstacle is encountered. In this type of mode of operation, an operator may start and stop combine/harvester 106 as needed. This type of mode may minimize the intervention needed by a driver.

In different illustrative embodiments, the different types of modes of operation may be used in combination to achieve the desired goals. In these examples, at least one of these modes of operation may be used to minimize driving while maximizing safety and efficiency in a harvesting process. In these examples, each of the different types of vehicles depicted may utilize each of the different types of modes of operation to achieve desired goals. As used herein the phrase "at least one of" when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. As another example, at least one of item A, item B, and item C may include item A, two of item B, and 4 of item C or some other combination types of items and/or number of items.

In different illustrative embodiments, dynamic conditions impact the movement of a vehicle. A dynamic condition is a change in the environment around a vehicle. For example, a dynamic condition may include, without limitation movement of another vehicle in the environment to a new location, detection of an obstacle, detection of a new object or objects in the environment, receiving user input to change the movement of the vehicle, receiving instructions from a back office, such as back office 102, and the like. In response to a dynamic condition, the movement of a vehicle may be altered in various ways, including, without limitation stopping the vehicle, accelerating propulsion of the vehicle, decelerating propulsion of the vehicle, and altering the direction of the vehicle, for example.

Further, autonomous routes may include several line segments. In other examples, a path may go around blocks in a square or rectangular pattern or follow field contours or boundaries. Of course, other types of patterns also may be used depending upon the particular implementation. Routes and patterns may be performed with the aid of a knowledge base in accordance with an illustrative embodiment. In these examples, an operator may drive combine/harvester 104 onto a field or to a beginning position of a path. The operator also may monitor combine/harvester 104 for safe operation and ultimately provide overriding control for the behavior of combine/harvester 104.

In these examples, a path may be a preset path, a path that is continuously planned with changes made by combine/harvester 104 to follow a leader in a side following mode, a path that is directed by an operator using a remote control in a teleoperation mode, or some other path. The path may be any length depending on the implementation. Paths may be stored and accessed with the aid of a knowledge base in accordance with an illustrative embodiment.

In these examples, heterogeneous sets of redundant sensors are located on multiple vehicles in a worksite to provide high integrity perception with fault tolerance. Redundant sensors in these examples are sensors that may be used to compensate for the loss and/or inability of other sensors to obtain information needed to control a vehicle. A redundant use of the sensor sets are governed by the intended use of each of the sensors and their degradation in certain dynamic conditions. The sensor sets robustly provide data for localization and/or safeguarding in light of a component failure or a temporary environmental condition. For example, dynamic conditions may be terrestrial and weather conditions that affect sensors and their ability to contribute to localization and safeguarding. Such conditions may include, without limitation, sun, clouds, artificial illumination, full moon light, new moon darkness, degree of sun brightness based on sun position due to season, shadows, fog, smoke, sand, dust, rain, snow, and the like.

Thus, the different illustrative embodiments provide a number of different modes to operate a number of different vehicles, such as combine/harvesters 104, 106, and 108. Although FIG. 1 illustrates a vehicle for agricultural work, this illustration is not meant to limit the manner in which different modes may be applied. For example, the different illustrative embodiments may be applied to other types of vehicles and other types of uses. As a specific example, the different illustrative embodiments may be applied to a military vehicle in which a soldier uses a side following mode to provide a shield across a clearing. In other embodiments, the vehicle may be a compact utility vehicle and have a chemical sprayer mounted and follow an operator as the operator applies chemicals to crops or other foliage. These types of modes also may provide obstacle avoidance and remote control capabilities. As yet another example, the different illustrative embodiments may be applied to delivery vehicles, such as those for the post office or other commercial delivery vehicles. The illustrative embodiments recognize a need for a system and method where a combination manned/autonomous vehicle can accurately navigate and manage a worksite. Therefore, the illustrative embodiments provide a computer implemented method, apparatus, and computer program product for controlling a vehicle. A dynamic condition is identified using a plurality of sensors on the vehicle and the vehicle is controlled using a knowledge base.

Figure 2B:
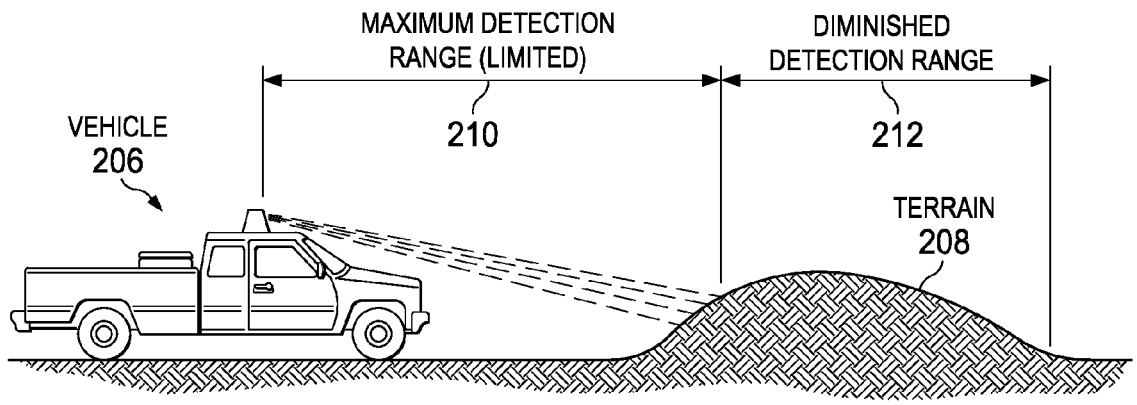

With reference now to FIGS. 2A and 2B, a block diagram illustrating vehicle perception used to adjust navigation is depicted in accordance with an illustrative embodiment. Vehicles 200 and 206 are examples of one or more of combine/harvesters 104, 106, and 108 in FIG. 1. Vehicle 200 travels across terrain 202 using sensors located on vehicle 200 to perceive attributes of the terrain. In normal operating conditions, max detection range 204 of the sensors on vehicle 200 offers good visibility of upcoming terrain in the path of vehicle 200. Vehicle 206 travels across terrain 208, which limits max detection range 210 and provides diminished detection range 212. Terrain 208 may be, for example, a structure or vegetation obscuring visibility, land topography limiting the sensors range of detection, and the like. Vehicle 206 may adjust the speed and following distance based upon the detection range available. For example, when approaching terrain 208 with diminished detection range 212, vehicle 206 may slow its speed in order to increase safeguarding capabilities, such as obstacle detection, obstacle avoidance, and emergency stopping. In an illustrative embodiment, vehicle 200 and vehicle 206 may be working in different areas of the same worksite. When vehicle 206 experiences diminished detection range 212, vehicle 206 may request sensor data information from vehicle 200. Sensor data is any data generated by a sensor. For example, diminished detection range 212 may be due to degradation of global positioning system capabilities based on the tree canopy of terrain 208. Vehicle 200, however, may be operating on a parallel or nearby path within the same worksite, but away from the tree canopy of terrain 208, with terrain 202 providing the global positioning system receiver located on vehicle 200 an ability to receive signals. The sensor system of vehicle 200 may determine a position estimate for vehicle 200, and a relative position estimate of vehicle 206 based on other sensors detecting the distance, speed, and location of vehicle 206. Vehicle 200 may then transmit localization information to vehicle 206, and vehicle 206 may use the information from the sensor system of vehicle 200 to determine a position estimate for vehicle 206 and thereby maintain vehicle speed and progression along the planned path.

Figure 3:
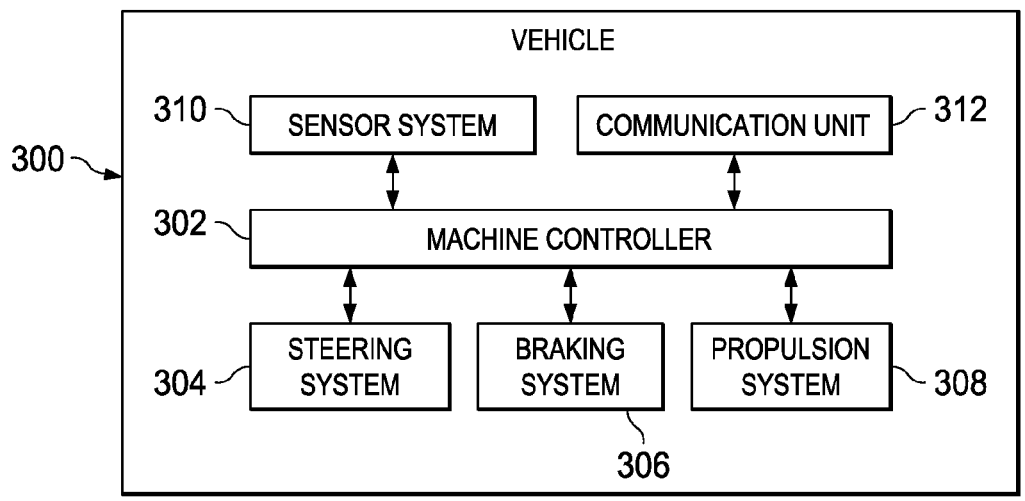
FIG. 3 is a block diagram of components used to control a vehicle in accordance with an illustrative embodiment.

With reference now to FIG. 3, a block diagram of components used to control a vehicle is depicted in accordance with an illustrative embodiment. In this example, vehicle 300 is an example of a vehicle, such as combine/harvesters 104, 106, and 108 in FIG. 1. Vehicle 300 is also an example of vehicle 200 and vehicle 206 in FIGS. 2A and 2B. In this example, vehicle 300 includes machine controller 302, steering system 304, braking system 306, propulsion system 308, sensor system 310, and communication unit 312.

Machine controller 302 may be, for example, a data processing system or some other device that may execute processes to control movement of a vehicle. Machine controller 302 may be, for example, a computer, an application integrated specific circuit, or some other suitable device. Machine controller 302 may execute processes to control steering system 304, braking system 306, and propulsion system 308 to control movement of the vehicle. Machine controller 302 may send various commands to these components to operate the vehicle in different modes of operation. These commands may take various forms depending on the implementation. For example, the commands may be analog electrical signals in which a voltage and/or current change is used to control these systems. In other implementations, the commands may take the form of data sent to the systems to initiate the desired actions. Steering system 304 may control the direction or steering of the vehicle in response to commands received from machine controller 302. Steering system 304 may be, for example, an electrically controlled hydraulic steering system, an electrically driven rack and pinion steering system, an Ackerman steering system, or some other suitable steering system. Braking system 306 may slow down and/or stop the vehicle in response to commands from machine controller 302. Braking system 306 may be an electrically controlled braking system. This braking system may be, for example, a hydraulic braking system, a friction braking system, or some other suitable braking system that may be electrically controlled.

In these examples, propulsion system 308 may propel or move the vehicle in response to commands from machine controller 302. Propulsion system 308 may maintain or increase the speed at which a vehicle moves in response to instructions received from machine controller 302. Propulsion system 308 may be an electrically controlled propulsion system. Propulsion system 308 may be, for example, an internal combustion engine, an internal combustion engine/electric hybrid system, an electric engine, or some other suitable propulsion system. Sensor system 310 may be a set of sensors used to collect information about the environment around vehicle 300. This information collected by sensor system 310 may be used for localization in identifying a location of vehicle 300 or a location of another vehicle in the environment. In these examples, the information is sent to machine controller 302 to provide data in identifying how the vehicle should move in different modes of operation. For example, braking system 306 may slow vehicle 300 in response to a limited detection range of sensor system 310 on vehicle 300, such as diminished detection range 212 in FIG. 2B. In these examples, a set refers to one or more items. A set of sensors is one or more sensors in these examples. Communication unit 312 may provide communications links to machine controller 302 to receive information. This information includes, for example, data, commands, and/or instructions. Communication unit 312 may take various forms. For example, communication unit 312 may include a wireless communications system, such as a cellular phone system, a Wi-Fi wireless system, a Bluetooth wireless system, or some other suitable wireless communications system. Further, communication unit 312 also may include a communications port, such as, for example, a universal serial bus port, a serial interface, a parallel port interface, a network interface, or some other suitable port to provide a physical communications link. Communication unit 312 may be used to communicate with a remote location or an operator. Communications unit 312 may include a battery back-up on a plurality of electronic modules that each operates at a different frequency in order to minimize the likelihood of common mode failure.

Figure 4:
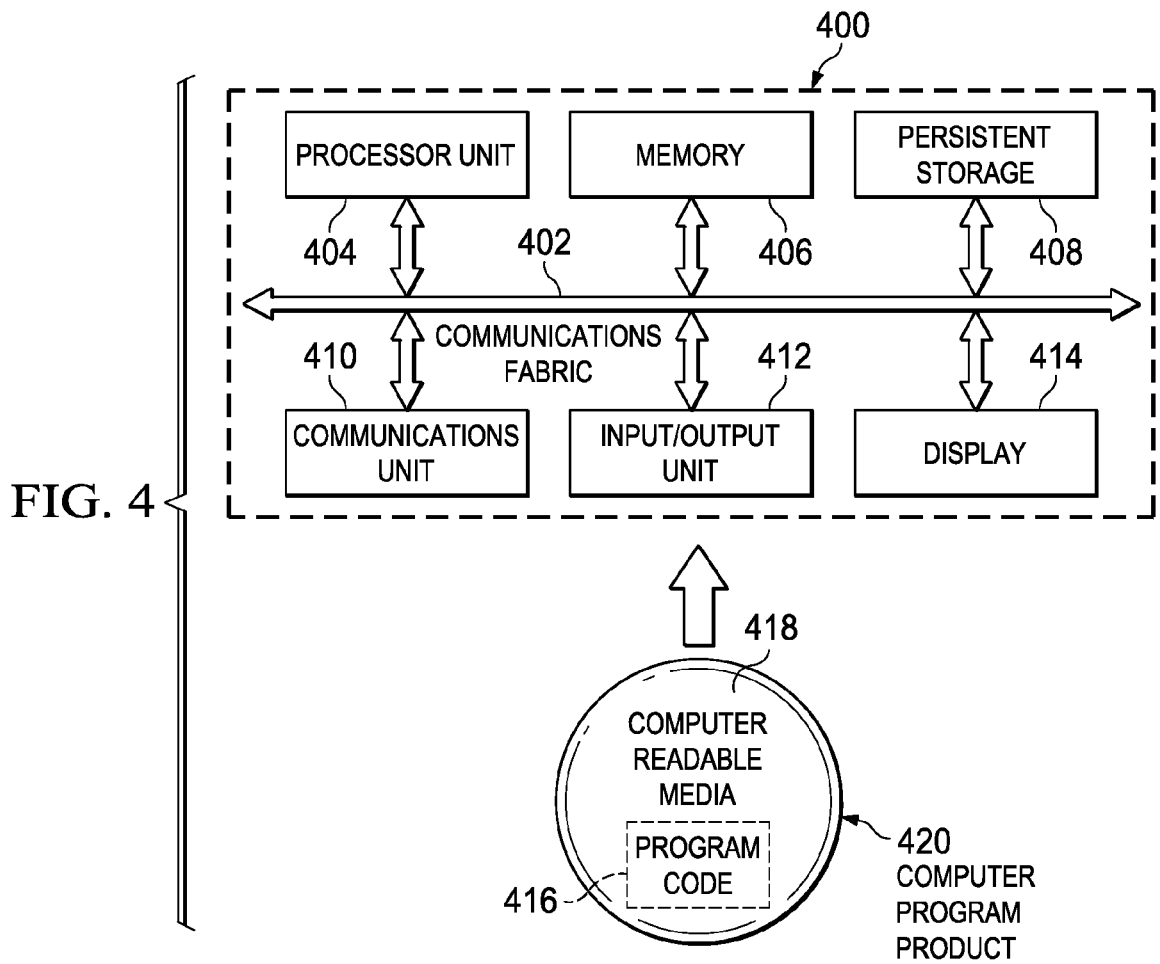
FIG. 4 is a block diagram of a data processing system in accordance with an illustrative embodiment.

With reference now to FIG. 4, a block diagram of a data processing system is depicted in accordance with an illustrative embodiment. Data processing system 400 is an example of one manner in which machine controller 302 in FIG. 3 may be implemented. In this illustrative example, data processing system 400 includes communications fabric 402, which provides communication between processor unit 404, memory 406, persistent storage 408, communications unit 410, input/output (I/O) unit 412, and display 414. Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type. Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408. Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user. Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408. Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 300 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. As one example, a storage device in data processing system 400 is any hardware apparatus that may store data. Memory 406, persistent storage 408, and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache, such as found in an interface and memory controller hub that may be present in communications fabric 402.

Figure 5:
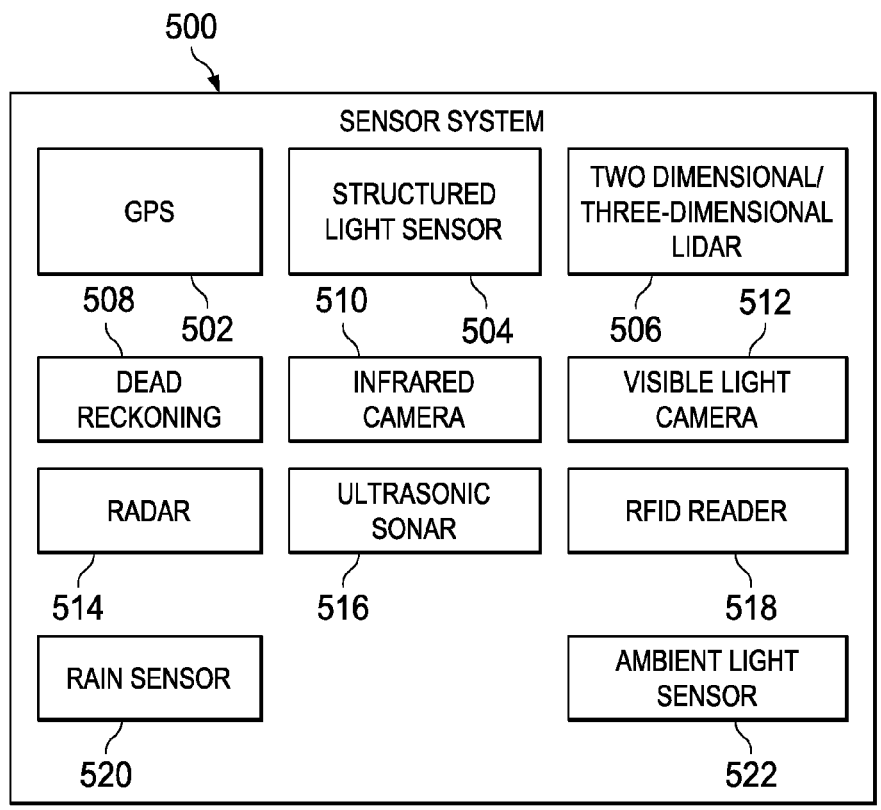
FIG. 5 is a block diagram of a sensor system in accordance with an illustrative embodiment.

With reference now to FIG. 5, a block diagram of a sensor system is depicted in accordance with an illustrative embodiment. Sensor system 500 is an example of one implementation of sensor system 310 in FIG. 3. Sensor system 500 includes redundant sensors. A redundant sensor in these examples is a sensor that may be used to compensate for the loss and/or inability of another sensor to obtain information needed to control a vehicle. A redundant sensor may be another sensor of the same type (homogenous) and/or a different type of sensor (heterogeneous) that is capable of providing information for the same purpose as the other sensor.

As illustrated, sensor system 500 includes, for example, global positioning system 502, structured light sensor 504, two dimensional/three dimensional lidar 506, dead reckoning 508, infrared camera 510, visible light camera 512, radar 514, ultrasonic sonar 516, radio frequency identification reader 518, rain sensor 520, and ambient light sensor 522. These different sensors may be used to identify the environment around a vehicle. For example, these sensors may be used to detect terrain in the path of a vehicle, such as terrain 202 and 208 in FIGS. 2A and 2B. In another example, these sensors may be used to detect a dynamic condition in the environment. The sensors in sensor system 500 may be selected such that one of the sensors is always capable of sensing information needed to operate the vehicle in different operating environments.

Global positioning system 502 may identify the location of the vehicle with respect to other objects in the environment. Global positioning system 502 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionspheric conditions, satellite constellation, and signal attenuation from vegetation.

Structured light sensor 504 emits light in a pattern, such as one or more lines, reads back the reflections of light through a camera, and interprets the reflections to detect and measure objects in the environment. Two dimensional/three dimensional lidar 506 is an optical remote sensing technology that measures properties of scattered light to find range and/or other information of a distant target. Two dimensional/three dimensional lidar 506 emits laser pulses as a beam, than scans the beam to generate two dimensional or three dimensional range matrices. The range matrices are used to determine distance to an object or surface by measuring the time delay between transmission of a pulse and detection of the reflected signal.

Dead reckoning 508 begins with a known position, which is then advanced, mathematically or directly, based upon known speed, elapsed time, and course. The advancement based upon speed may use the vehicle odometer, or ground speed radar, to determine distance traveled from the known position. Infrared camera 510 detects heat indicative of a living thing versus an inanimate object. An infrared camera may also form an image using infrared radiation. Visible light camera 512 may be a standard still-image camera, which may be used alone for color information or with a second camera to generate stereoscopic or three-dimensional images. When visible light camera 512 is used along with a second camera to generate stereoscopic images, the two or more cameras may be set with different exposure settings to provide improved performance over a range of lighting conditions. Visible light camera 512 may also be a video camera that captures and records moving images. Radar 514 uses electromagnetic waves to identify the range, altitude, direction, or speed of both moving and fixed objects. Radar 514 is well known in the art, and may be used in a time of flight mode to calculate distance to an object, as well as Doppler mode to calculate the speed of an object. Ultrasonic sonar 516 uses sound propagation on an ultrasonic frequency to measure the distance to an object by measuring the time from transmission of a pulse to reception and converting the measurement into a range using the known speed of sound. Ultrasonic sonar 516 is well known in the art and can also be used in a time of flight mode or Doppler mode, similar to radar 514. Radio frequency identification reader 518 relies on stored data and remotely retrieves the data using devices called radio frequency identification (RFID) tags or transponders. Rain sensor 520 detects precipitation on an exterior surface of the vehicle. Ambient light sensor 522 measures the amount of ambient light in the environment.

Sensor system 500 may retrieve environmental data from one or more of the sensors to obtain different perspectives of the environment. For example, sensor system 500 may obtain visual data from visible light camera 512, data about the distance of the vehicle in relation to objects in the environment from two dimensional/three dimensional lidar 506, and location data of the vehicle in relation to a map from global positioning system 502.

Sensor system 500 is capable of detecting objects even in different operating environments. For example, global positioning system 502 may be used to identify a position of the vehicle. If a field is surrounded by trees with thick canopies during the spring, global positioning system 502 may be unable to provide location information on some areas of the field. In this situation, visible light camera 512 and/or two-dimensional/three-dimensional lidar 506 may be used to identify a location of the vehicle relative to non-mobile objects, such as telephone poles, trees, roads and other suitable landmarks.

In addition to receiving different perspectives of the environment, sensor system 500 provides redundancy in the event of a sensor failure, which facilitates high-integrity operation of the vehicle. For example, in an illustrative embodiment, if visible light camera 512 is the primary sensor used to identify the location of the operator in side-following mode, and visible light camera 512 fails, radio frequency identification reader 518 will still detect the location of the operator through a radio frequency identification tag worn by the operator, thereby providing redundancy for safe operation of the vehicle.

Figure 6:
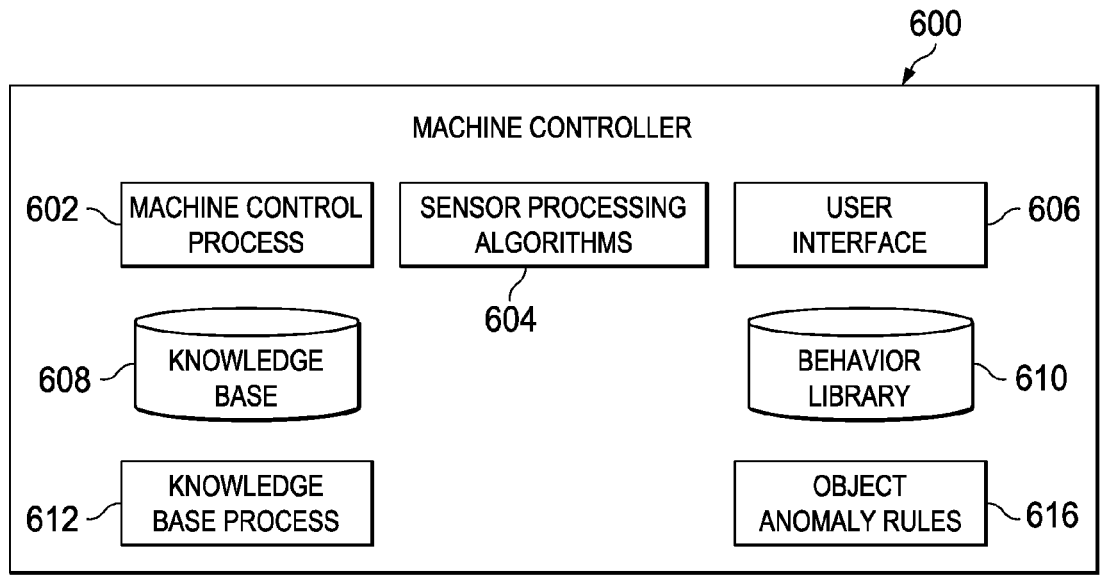
FIG. 6 is a block diagram of functional software components that may be implemented in a machine controller in accordance with an illustrative embodiment.

With reference now to FIG. 6, a block diagram of functional software components that may be implemented in a machine controller is depicted in accordance with an illustrative embodiment. In this example, different functional software components that may be used to control a vehicle are illustrated. The vehicle may be a vehicle, such as combine/harvester 104, 106, and 108 in FIG. 1. Machine controller 600 may be implemented in a vehicle, such as vehicle 200 and vehicle 206 in FIGS. 2A and 2B or vehicle 300 in FIG. 3 using a data processing system, such as data processing system 400 in FIG. 4. In this example machine control process 602, sensor processing algorithms 604, user interface 606, knowledge base 608, behavior library 610, knowledge base process 612, and object anomaly rules 616 are present in machine controller 600.

Machine control process 602 transmits signals to steering, braking, and propulsion systems, such as steering system 304, braking system 306, and propulsion system 308 in FIG. 3. Machine control process 602 may also transmit signals to components of a sensor system, such as sensor system 500 in FIG. 5. For example, in an illustrative embodiment, machine control process 602 transmits a signal to a camera component of sensor system 500 in order to pan, tilt, or zoom a lens of the camera to acquire different images and perspectives of an environment around the vehicle. Machine control process 602 may also transmit signals to sensors within sensor system 500 in order to activate, deactivate, or manipulate the sensor itself. Sensor processing algorithms 604 receives sensor data from sensor system 500 and classifies the sensor data into thematic features. This classification may include identifying objects that have been detected in the environment. For example, sensor processing algorithms 604 may classify an object as a person, telephone pole, tree, road, light pole, driveway, fence, or some other type of object. The classification may be performed to provide information about objects in the environment. This information may be used to generate a thematic map, which may contain a spatial pattern of attributes. The attributes may include classified objects. The classified objects may include dimensional information, such as, for example, location, height, width, color, and other suitable information. This map may be used to plan actions for the vehicle. The action may be, for example, planning paths to follow an operator in a side following mode or performing object avoidance.

The classification may be done autonomously or with the aid of user input through user interface 606. For example, in an illustrative embodiment, sensor processing algorithms 604 receives data from a laser range finder, such as two dimensional/three dimensional lidar 506 in FIG. 5, identifying points in the environment. User input may be received to associate a data classifier with the points in the environment, such as, for example, a data classifier of "tree" associated with one point, and "fence" with another point. Tree and fence are examples of thematic features in an environment. Sensor processing algorithms 604 then interacts with knowledge base 608 to locate the classified thematic features on a thematic map stored in knowledge base 608, and calculates the vehicle position based on the sensor data in conjunction with the landmark localization. Machine control process 602 receives the environmental data from sensor processing algorithms 604, and interacts with knowledge base 608 and behavior library 610 in order to determine which commands to send to the vehicle's steering, braking, and propulsion components.

Sensor processing algorithms 604 analyzes sensor data for accuracy and fuses selected sensor data to provide a single value that may be shared with other machines. Analyzing the sensor data for accuracy involves determining an accuracy level for the sensor data based on the sensor data relative to other sensor data and the confidence level in the sensor. For example, with global positioning data from a global positioning system receiver, the reported change in position in latitude and longitude may be compared with radar and wheel-based odometry. If the global positioning system distance is a certain percentage different from two close values from other sources, it is considered an outlier. The distance may also be compared to a theoretical maximum distance a vehicle could move in a given unit of time. Alternately, the current satellite geometric dilution of precision could be used to validate the latitude and longitude for use in further computations. The accuracy level will influence which sensor data is fused and which sensor data is considered an outlier. Outliers are determined using statistical methods commonly known in the field of statistics. Sensor data is fused by mathematically processing the sensor data to obtain a single value used to determine relative position. Examples of this mathematical processing include, but are not limited to, simple averaging, weighted averaging, and median filtering. Component failures of a sensor system on a vehicle can then be detected by comparing the position and environment information provided by each sensor or fused set of sensors. For example, if a sensor is out of a margin of error for distance, angle, position, and the like, it is likely that the sensor has failed or is compromised and should be removed from the current calculation. Repeated excessive errors are grounds for declaring the sensor failed until a common mode root cause is eliminated, or until the sensor is repaired or replaced. In an illustrative embodiment, a global positioning system, such as global positioning system 502 of sensor system 500 in FIG. 5, on a vehicle, such as combine/harvester 106 in FIG. 1, determines its own position. Furthermore, it detects the position of another vehicle, such as combine/harvester 104, as being fifty feet ahead and thirty degrees to its left. One visible light camera, such as visible light camera 512 in FIG. 5, on combine/harvester 106 detects combine/harvester 104 as being forty-eight feet ahead and twenty-eight degrees left, while another visible light camera on combine/harvester 106 detects combine/harvester 104 as being forty-nine feet ahead and twenty-nine degrees left. A lidar, such as two dimensional/three dimensional lidar 506 in FIG. 5, on combine/harvester 106 detects combine/harvester 104 as being fifty-one feet ahead and thirty-one degrees left. Sensor processing algorithms 604 receives the sensor data from the global positioning system, visible light cameras, and lidar, and fuses them together using a simple average of distances and angles to determine the relative position of combine/harvester 104 as being 49.5 feet ahead and 29.5 degrees left.

These illustrative examples are not meant to limit the invention in any way. Multiple types of sensors and sensor data may be used to perform multiple types of localization. For example, the sensor data may be fused to determine the location of an object in the environment, or for obstacle detection. Sensor data analysis and fusion may also be performed by machine control process 602 in machine controller 600.

Knowledge base 608 contains information about the operating environment, such as, for example, a fixed map showing streets, structures, tree locations, and other static object locations. Knowledge base 608 may also contain information, such as, without limitation, local flora and fauna of the operating environment, current weather for the operating environment, weather history for the operating environment, specific environmental features of the work area that affect the vehicle, and the like. The information in knowledge base 608 may be used to perform classification and plan actions. Knowledge base 608 may be located entirely in machine controller 600 or parts or all of knowledge base 608 may be located in a remote location that is accessed by machine controller 600. Behavior library 610 contains various behavioral processes specific to machine coordination that can be called and executed by machine control process 602. In one illustrative embodiment, there may be multiple copies of behavior library 610 on machine controller 600 in order to provide redundancy. The library is accessed by machine control process 602.

Knowledge base process 612 interacts with sensor processing algorithms 604 to receive processed sensor data about the environment, and in turn interacts with knowledge base 608 to classify objects detected in the processed sensor data. Knowledge base process 612 also informs machine control process 602 of the classified objects in the environment in order to facilitate accurate instructions for machine control process 602 to send to steering, braking, and propulsion systems. For example, in an illustrative embodiment, sensor processing algorithms 604 detects tall, narrow, cylindrical objects along the side of the planned path. Knowledge base process 612 receives the processed data from sensor processing algorithms 604 and interacts with knowledge base 608 to classify the tall, narrow, cylindrical objects as tree trunks. Knowledge base process 612 can then inform machine control process 602 of the location of the tree trunks in relation to the vehicle, as well as any further rules that may apply to tree trunks in association with the planned path.

Object anomaly rules 616 provide machine control process 602 instructions on how to operate the vehicle when an anomaly occurs, such as sensor data received by sensor processing algorithms 604 being incongruous with environmental data stored in knowledge base 608. For example, object anomaly rules 616 may include, without limitation, instructions to alert the operator via user interface 606 or instructions to activate a different sensor in sensor system 500 in order to obtain a different perspective of the environment.

Figure 7:
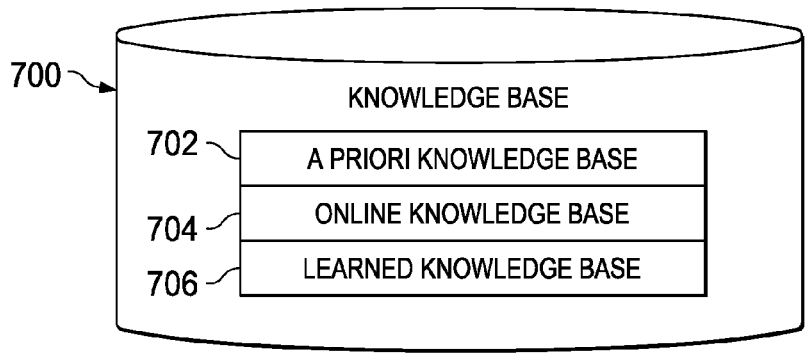
FIG. 7 is a block diagram of a knowledge base in accordance with an illustrative embodiment.

With reference now to FIG. 7, a block diagram of a knowledge base is depicted in accordance with an illustrative embodiment. Knowledge base 700 is an example of a knowledge base component of a machine controller, such as knowledge base 608 of machine controller 600 in FIG. 6. For example, knowledge base 700 may be, without limitation, a component of a navigation system, an autonomous machine controller, a semi-autonomous machine controller, or may be used to make management decisions regarding work-site activities. Knowledge base 700 includes a priori knowledge base 702, online knowledge base 704, and learned knowledge base 706.

A priori knowledge base 702 contains static information about the operating environment of a vehicle. Types of information about the operating environment of a vehicle may include, without limitation, a fixed map showing streets, structures, trees, and other static objects in the environment; stored geographic information about the operating environment; and weather patterns for specific times of the year associated with the operating environment. A priori knowledge base 702 may also contain fixed information about objects that may be identified in an operating environment, which may be used to classify identified objects in the environment. This fixed information may include attributes of classified objects, for example, an identified object with attributes of tall, narrow, vertical, and cylindrical, may be associated with the classification of "telephone pole." A priori knowledge base 702 may further contain fixed work-site information. A priori knowledge base 702 may be updated based on information from online knowledge base 704, and learned knowledge base 706.

Online knowledge base 704 may be accessed with a communications unit, such as communications unit 312 in FIG. 3, to wirelessly access the Internet. Online knowledge base 704 dynamically provides information to a machine control process which enables adjustment to sensor data processing, site-specific sensor accuracy calculations, and/or exclusion of sensor information. For example, online knowledge base 704 may include current weather conditions of the operating environment from an online source. In some examples, online knowledge base 704 may be a remotely accessed knowledge base. This weather information may be used by machine control process 602 in FIG. 6 to determine which sensors to activate in order to acquire accurate environmental data for the operating environment. Weather, such as rain, snow, fog, and frost may limit the range of certain sensors, and require an adjustment in attributes of other sensors in order to acquire accurate environmental data from the operating environment. Other types of information that may be obtained include, without limitation, vegetation information, such as foliage deployment, leaf drop status, and lawn moisture stress, and construction activity, which may result in landmarks in certain regions being ignored. In another illustrative environment, online knowledge base 704 may be used to note when certain activities are in process that affect operation of sensor processing algorithms in machine controller 600. For example, if tree pruning is in progress, a branch matching algorithm should not be used, but a tree trunk matching algorithm may still be used, as long as the trees are not being cut down completely. When the machine controller receives user input signaling that the pruning process is over, the sensor system may collect environmental data to analyze and update a priori knowledge base 702.

Learned knowledge base 706 may be a separate component of knowledge base 700, or alternatively may be integrated with a priori knowledge base 702 in an illustrative embodiment. Learned knowledge base 706 contains knowledge learned as the vehicle spends more time in a specific work area, and may change temporarily or long-term depending upon interactions with online knowledge base 704 and user input. For example, learned knowledge base 706 may detect the absence of a tree that was present the last time it received environmental data from the work area. Learned knowledge base 706 may temporarily change the environmental data associated with the work area to reflect the new absence of a tree, which may later be permanently changed upon user input confirming the tree was in fact cut down. Learned knowledge base 706 may learn through supervised or unsupervised learning.

With reference now to FIG. 8, a block diagram of a format in a knowledge base used to select sensors for use in planning paths and obstacle avoidance is depicted in accordance with an illustrative embodiment. This format may be used by knowledge base process 612 and machine control process 602 in FIG. 6. The format is depicted in sensor table 800 illustrating heterogeneous sensor redundancy for localization of a vehicle on a street. This illustrative embodiment is not meant to limit the present invention in any way. Other illustrative embodiments may use this format for localization of a vehicle on a field, golf course, off-road terrain, and other geographical areas.

Global positioning systems 802 would likely not have real time kinematic accuracy in a typical street environment due to structures and vegetation. Normal operating conditions 804 would provide good to poor quality signal reception 806 because the global positioning system signal reception quality would depend upon the thickness of the tree canopy over the street. In early fall 808, when some leaves are still on the trees and others are filling the gutter or ditch alongside the road, the canopy thickness may offer good to poor quality signal reception 810. However, in winter 812, when trees other than evergreens tend to have little to no leaves, signal reception may be good to very good 814. Visible camera images of a curb or street edge 816 might offer excellent quality images 818 in normal operating conditions 804. However, in early fall 808 and winter 812, when leaves or snow obscure curb or street edge visibility, visible camera images would offer unusable quality images 820 and 822. Visible camera images 824 of the area around the vehicle, with an image height of eight feet above the ground, would offer excellent quality images 826, 828, and 830 in most seasons, although weather conditions, such as rain or fog may render the images unusable. Landmarks identified at eight feet above the ground include objects, such as, without limitation, houses, light poles, and tree trunks. This height is typically below tree canopies and above transient objects, such as cars, people, bikes, and the like, and provides a quality zone for static landmarks. Visible camera images of the street crown 832 may offer good quality images 834 in normal operating conditions 804. The street crown is typically the center of the street pavement, and images of the pavement may be used in a pavement pattern matching program for vehicle localization. In early fall 808, when leaves begin to fall and partially obscure the pavement, visible camera images of the street crown 832 may be good to poor quality images 836 depending on the amount of leaves on the ground. In winter 812, the visible camera images of the street crown 832 may be unusable quality images 838 due to fresh snow obscuring the pavement. Lidar images of a curb 840 using pulses of light may be excellent 842 for detecting a curb or ground obstacle in normal operating conditions 804, but may be unusable 844 when curb visibility is obscured by leaves in early fall 808 or snow in winter 812. Lidar detection of the area eight feet above the ground 846 around the vehicle may be excellent 848 in normal operating conditions 804, early fall 808, and winter 812, because the landmarks, such as houses and tree trunks, are not obscured by falling leaves or fresh snow. Lidar images of the sky 850 captures limb patterns above the street for use in limb pattern matching for vehicle localization. Lidar images of the sky 850 would be unusable due to the canopy 852 in normal operating conditions 804, and unusable to poor 854 in the early fall 808 when the majority of leaves remain on the limbs. However, lidar images of the sky 850 may be excellent 856 in winter 812 when limbs are bare.

Figure 9:
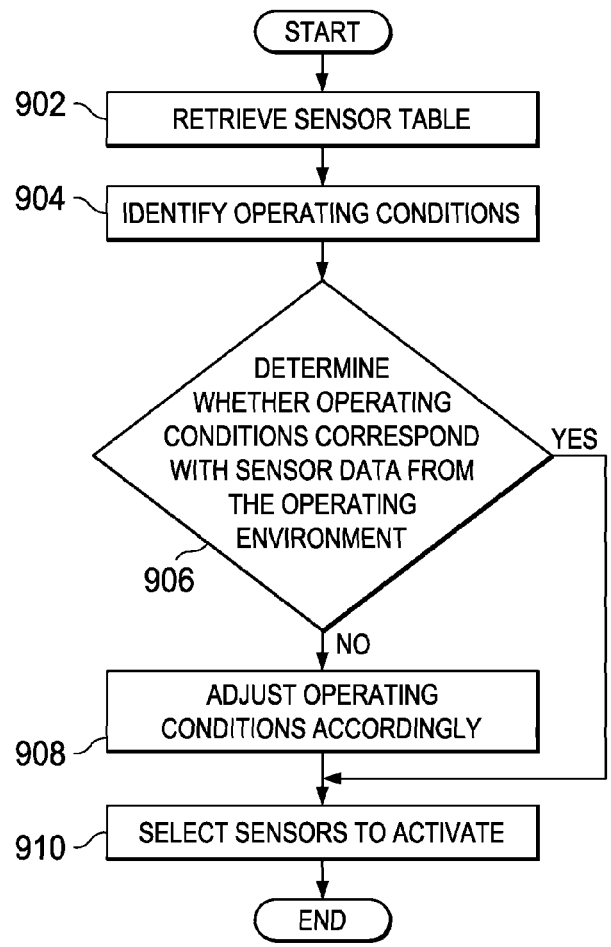
FIG. 9 is a flowchart illustrating a process for sensor selection in accordance with an illustrative embodiment.

In another illustrative example, a group of three coordinated combines may be tasked with harvesting a crop, such as combine/harvester 104, 106, and 108 on field 110 in FIG. 1. In this example, multiple vehicles are working together, potentially operating in close proximity on field 110. The worksite, field 110, may have few fixed visual landmarks, such as telephone poles, for task-relative localization. In this example, communication between combine/harvester 104, 106, and 108 is important for vehicle-relative localization. The goals for combine/harvester 104, 106, and 108 may be the following: not to harm people, property, or self; not to skip any of the crop for harvesting; perform efficiently with minimum overlap between passes; and perform efficiently with optimal coordination between vehicles. In order to meet these goals in view of the work-site environment, a combination of sensors, such as global positioning system 502, visible light camera 512, and two dimensional/three dimensional lidar 506 in FIG. 5 may be used to estimate vehicle position relative to other vehicles on the worksite and maintain a safe distance between each vehicle. With reference now to FIG. 9, a flowchart illustrating a process for sensor selection is depicted in accordance with an illustrative embodiment. This process may be executed by knowledge base process 612 in FIG. 6 or by sensor processing algorithms 604 in FIG. 6.

The process begins by retrieving the sensor table (step 902), such as sensor table 800 in FIG. 8. The process identifies operating conditions (step 904) in the operating environment through sensor data received from a sensor system, such as sensor system 500 in FIG. 5 or online knowledge base 704 in FIG. 7. The process then determines whether the operating conditions in the sensor table correspond with sensor data from the operating environment (step 906). If the sensor data from the environment does not correspond to the preset operating conditions in the sensor table, the process adjusts the operating conditions accordingly (step 908) and selects the sensors to activate (step 910), with the process terminating thereafter. If the process determines that the sensor data corresponds with the sensor table information, the process moves directly to select the sensors to activate (step 910), with the process terminating thereafter.

Figure 10:
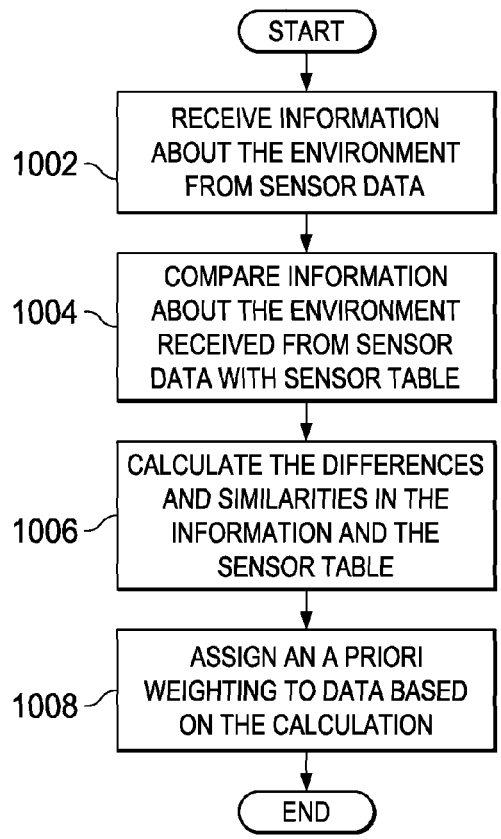
FIG. 10 is a flowchart illustrating a process for prioritizing sensor data in accordance with an illustrative embodiment.

With reference now to FIG. 10, a flowchart illustrating a process for prioritizing sensor data is depicted in accordance with an illustrative embodiment. This process may be executed by machine controller 302 in FIG. 3. The process begins by receiving information about the environment from sensor data (step 1002) and comparing the information about the environment received from sensor data with the sensor table (step 1004) stored in a priori knowledge base 702 in FIG. 7. Next, the process calculates the differences and similarities in the information and the sensor table (step 1006) and assigns an a priori weighting to the data based on the calculation (step 1008), with the process terminating thereafter.

For example, the vehicle may be operating in normal operating conditions mode, with the online knowledge base indicating it is spring. The sensor table may indicate that the appropriate sensors for normal operating conditions are a visible light camera with a view of the street crown, and a visible light camera with a view of the road edge. However, information about the environment received from the sensors may indicate that snow is covering the ground and obscuring the street and curb or road edge, perhaps due to a late snow. The detection of snow may be verified by accessing the online knowledge base for current weather conditions. As a result, the sensor data indicating the presence of snow may be weighed more heavily than information from the sensor table about normal operating conditions, with the sensors chosen to activate adjusted accordingly.

Figure 11:
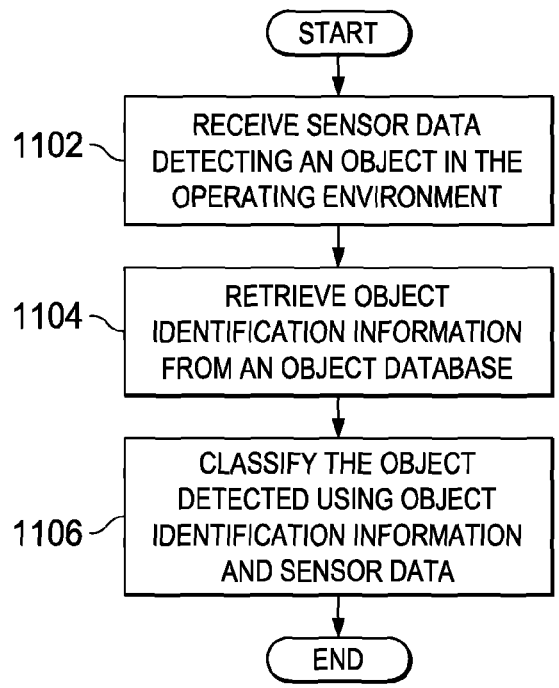
FIG. 11 is a flowchart illustrating a process for object classification in accordance with an illustrative embodiment.

With reference now to FIG. 11, a flowchart illustrating a process for object classification is depicted in accordance with an illustrative embodiment. This process may be implemented by knowledge base process 612 in FIG. 6. The process begins by receiving sensor data detecting an object in the operating environment (step 1102). For example, without limitation, an object might be a tree, light pole, person, animal, vehicle, and the like. Next, the process retrieves object identification information from an object database (step 1104) located in a priori knowledge base 702 in FIG. 7. Object information includes attributes and classifiers for objects detected in an operating environment. Attributes may include, for example, features such as tall, narrow, vertical, cylindrical, smooth texture, rough texture, bark texture, branches, leaves, no branches, no leaves, short, color, four to six inch high vertical, interruption in four to six inch high vertical, and the like. Classifiers may include, for example, tree, light pole, fire hydrant, curb, driveway, street, waste container, house, garage door, and the like. The process classifies the object detected using object identification information and sensor data (step 1106), with the process terminating thereafter.

Figure 12:
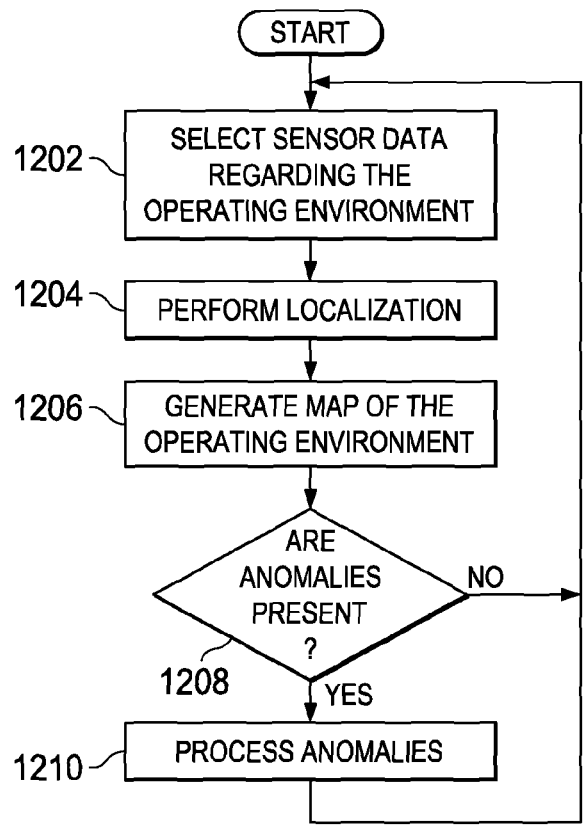
FIG. 12 is a flowchart illustrating a process for processing object anomalies in accordance with an illustrative embodiment.

With reference now to FIG. 12, a flowchart illustrating a process for processing object anomalies is depicted in accordance with an illustrative embodiment. The process illustrated in FIG. 12 may be implemented in a software component, such as machine control process 602, using object anomaly rules 616 in FIG. 6. The process begins by selecting sensor data regarding the operating environment (step 1202). The process performs localization (step 1204) based on the sensor data, and generates a map of the operating environment (step 1206). The map may be generated by accessing a fixed map and route database of an a priori knowledge base, such as a priori knowledge base 702 in FIG. 7, and retrieving the map associated with the location of the vehicle as identified by the sensor system, such as sensor system 500 in FIG. 5. Next, the process determines whether object anomalies are present (step 1208). An object anomaly may be, for example, the presence of an object that is unaccounted for, the presence of an object that is not yet identified, a change in a previously identified object, the absence of an object, and the like. If anomalies are not present, the process returns to select sensor data regarding the operating environment (step 1202). If anomalies are present, the process processes the anomalies (step 1210), and returns to select sensor data regarding the operating environment (step 1202). Processing anomalies may include updating one or more knowledge bases, such as learned knowledge base 706 in FIG. 7, with the object anomaly information.

Figure 13:
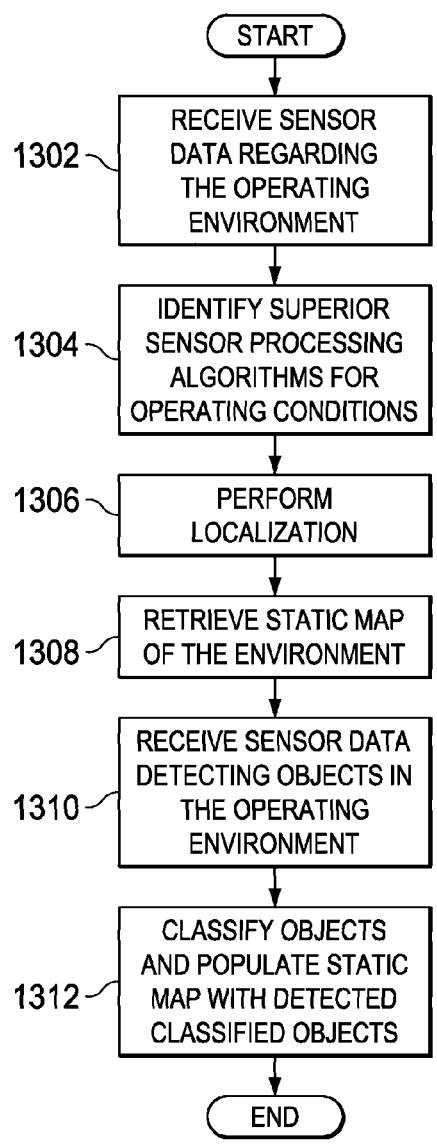
FIG. 13 is a flowchart illustrating a process for generating a thematic map in accordance with an illustrative embodiment.

With reference now to FIG. 13, a flowchart illustrating a process for generating a thematic map is depicted in accordance with an illustrative embodiment. The process illustrated in FIG. 13 may be implemented in a software component, such as knowledge base process 612 in FIG. 6. The process begins by receiving sensor data regarding the operating environment (step 1302). The process identifies superior sensor processing algorithms for the operating conditions (step 1304) and performs localization (step 1306). Next, the process retrieves a static map of the environment (step 1308) from a fixed map/route database in a priori knowledge base 702 in FIG. 7 for example. The process receives sensor data detecting objects in the operating environment (step 1310) from a sensor system, such as sensor system 500 in FIG. 5. The process then classifies the objects and populates the static map with the detected classified objects (step 1312) in order to form a thematic map, with the process terminating thereafter. The thematic map may be stored in a knowledge base, such as knowledge base 608 in FIG. 6 and used by machine control process 602 in FIG. 6 to execute a planned path while avoiding obstacles identified in the thematic map.

Figure 14:
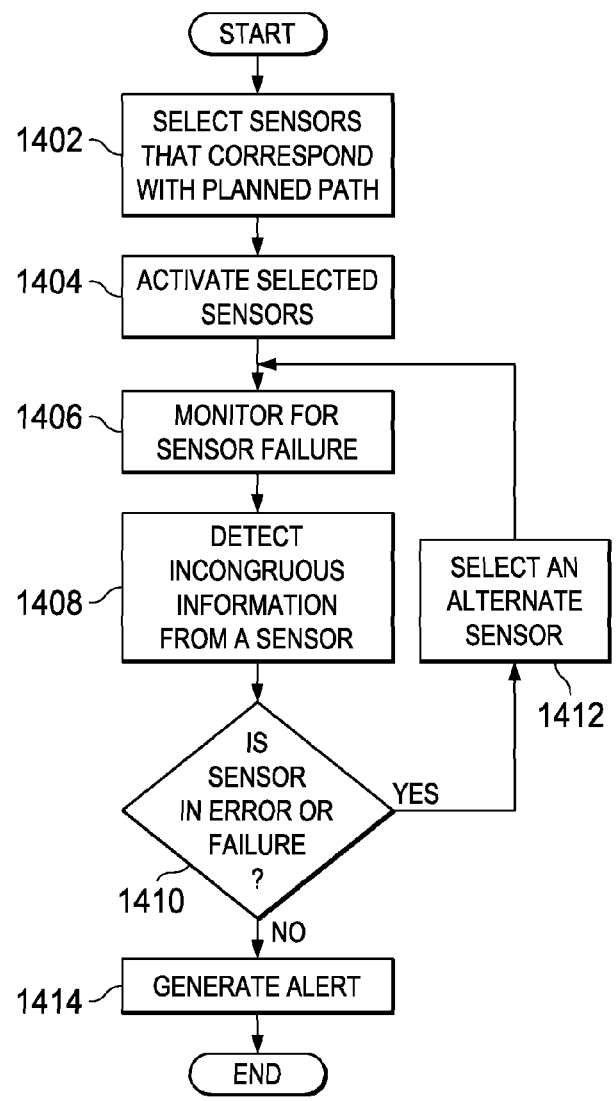
FIG. 14 is a flowchart illustrating a process for monitoring sensor integrity in accordance with an illustrative embodiment.

With reference now to FIG. 14, a flowchart illustrating a process for monitoring sensor integrity is depicted in accordance with an illustrative embodiment. This process may be implemented by machine controller 302 in FIG. 3. The process begins by selecting sensors that correspond with the planned path (step 1402). For example, a planned path of a residential street may correspond with a visible camera sensor during summer months when the curb is clearly visible. Next, the process activates the selected sensors (step 1404) and monitors for sensor failure (step 1406). When the process detects incongruous information from a sensor (step 1408), the process determines whether the sensor is in error or failure (step 1410). If the sensor is in error or failure, the process selects an alternate sensor (step 1412), and continues to monitor for sensor failure (step 1406). If the sensor is not in error or failure, the process generates an alert (step 1414), with the process terminating thereafter.

Figure 15:
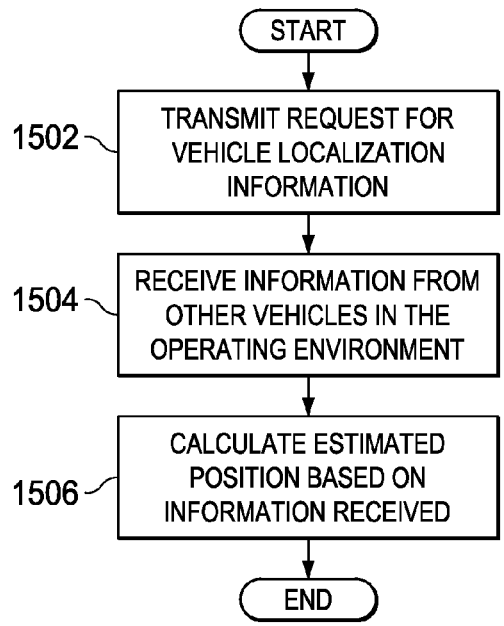
FIG. 15 is a flowchart illustrating a process for requesting localization information from another vehicle in accordance with an illustrative embodiment.

With reference now to FIG. 15, a flowchart illustrating a process for requesting localization information from another vehicle is depicted in accordance with an illustrative embodiment. The process may be implemented by machine controller 302 utilizing communications unit 312 in FIG. 3. This process may be implemented by a vehicle that is unable to obtain needed information, such as sensor data. In these examples, needed sensor data is any sensor data that is needed to control the vehicle. The sensor data may be, for example, data needed to perform localization.

The process begins by transmitting a request for vehicle localization information (step 1502) to other vehicles working in the same worksite. For example, in an illustrative embodiment, combine/harvester 106 in FIG. 1 may lose global positioning system capabilities and be unable to determine a global position estimate. Combine/harvester 106 may transmit the request for localization information to combine/harvester 104 and 108 in order to utilize the sensor information detected from the sensor system on each of combine/harvester 104 and 108 respectively to determine the position estimate of combine/harvester 106.

Next, the process receives information from other vehicles in the operating environment (step 1504). The information may be referred to as alternate information and may include alternate sensor data. In other examples, the information also may include information from an online knowledge base that may not be reachable by the vehicle if a communications unit has failed.

In an illustrative embodiment, the sensor information received from other vehicles, such as combine/harvester 104 and 108 in FIG. 1, may indicate the position estimate of each vehicle based on global positioning system information, as well as a relative position estimate of each vehicle in relation to the requesting vehicle, such as combine/harvester 106 in FIG. 1. Combine/harvester 106 may then use the position estimate of each vehicle and the relative position estimate of each vehicle in relation to combine/harvester 106 to determine a position estimate of combine/harvester 106. Information received may also include, without limitation, data indicating the distance of one vehicle from another vehicle and the angle or trajectory of a vehicle. The process then calculates an estimated position based on the information received (step 1506), with the process terminating thereafter.

Although this process has been illustrated with respect to obtaining localization information for the vehicle, the process may be applied to obtain other information for localizing other objects. For example, localization information may be requested and received to identify objects around the vehicle. In this manner the vehicle may identify obstacles.

Figure 16:
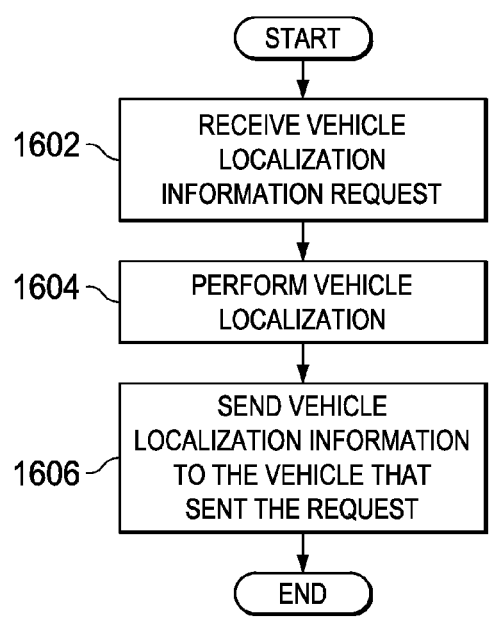
FIG. 16 is a flowchart illustrating a process for transmitting localization information to another vehicle in accordance with an illustrative embodiment.

With reference now to FIG. 16, a flowchart illustrating a process for transmitting localization information to another vehicle is depicted in accordance with an illustrative embodiment. The process may be implemented by machine controller 302 utilizing communications unit 312 in FIG. 3.

The process begins by receiving a vehicle localization information request (step 1602) from another vehicle. For example, a vehicle, such as combine/harvester 106, which has lost sensor capabilities necessary for determining a vehicle position estimate, may request information from a sensor system of another vehicle working in the same worksite. Next, the process performs vehicle localization (step 1604), using the sensor system of the vehicle to determine a position estimate of the vehicle in relation to a map or route. Then, the process sends the vehicle localization information to the vehicle that sent the request (step 1606), with the process terminating thereafter.

Figure 17:
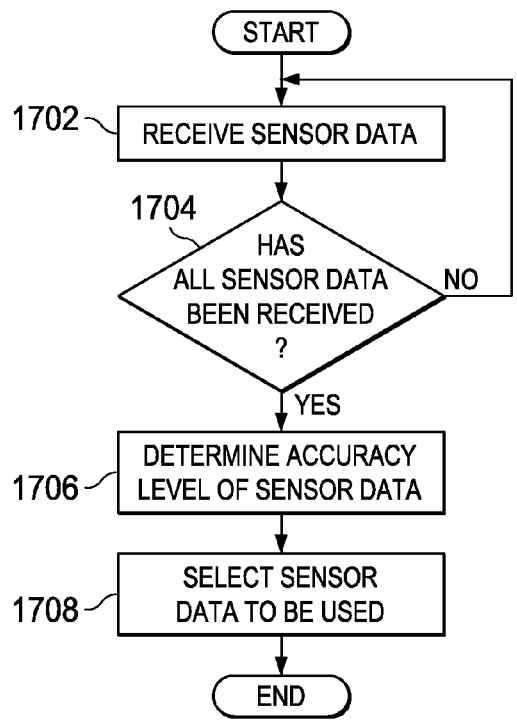
FIG. 17 is a flowchart illustrating a process for selecting sensor data to be used in accordance with an illustrative embodiment.

With reference now to FIG. 17, a flowchart illustrating a process for selecting sensor data to be used is depicted in accordance with an illustrative embodiment. This process may be implemented by a software component, such as sensor processing algorithms 604 or machine control process 602 in FIG. 6.

The process begins by receiving sensor data (step 1702) from a plurality of sensors in a sensor system, such as sensor system 500 in FIG. 5, located on a vehicle, such as one of combine/harvesters 104, 106, and 108. The process determines whether all sensor data has been received (step 1704) from the sensor system. If all of the sensor data has not been received, the process returns to step 1702 and receives further sensor data. If all of the sensor data has been received, the process then determines an accuracy level for the sensor data (step 1706) of each sensor from which sensor data was received. For example, if sensor data was received from four sensors, a global positioning system, a visible light camera, a lidar, and an infrared sensor, the accuracy level of the sensor data from each sensor is determined. Analyzing the sensor data for accuracy involves determining an accuracy level for the sensor data based on the sensor data relative to other sensor data and the confidence level in the sensor. For example, if a sensor is out of a margin of error for distance, angle, position, and the like, it is likely that the sensor has failed or is compromised and should be removed from the current calculation. Repeated excessive errors are grounds for declaring the sensor failed until a common mode root cause is eliminated, or until the sensor is repaired or replaced. Once the accuracy level is determined, the process selects sensor data to be used (step 1708), with the process terminating thereafter.

Figure 18:
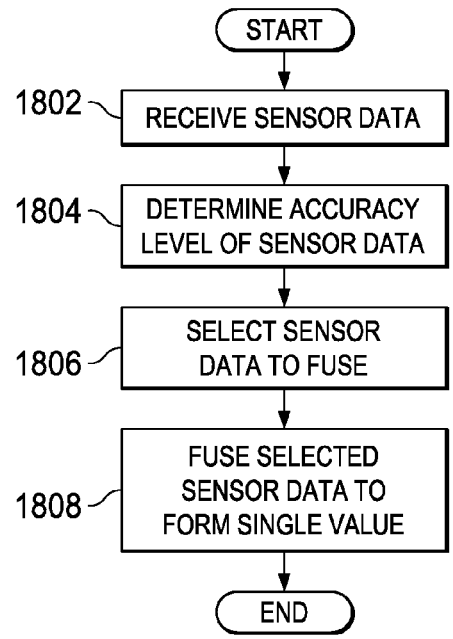
FIG. 18 is a flowchart illustrating a process for sensor data fusion in accordance with an illustrative embodiment.

With reference now to FIG. 18, a flowchart illustrating a process for sensor data fusion is depicted in accordance with an illustrative embodiment. This process may be implemented by a software component, such as sensor processing algorithms 604 or machine control process 602 in FIG. 6.

The process begins by receiving sensor data (step 1802) from a plurality of sensors in a sensor system, such as sensor system 500 in FIG. 5, located on a vehicle, such as one of combine/harvesters 104, 106, and 108. The process determines an accuracy level for the sensor data (step 1804) and selects sensor data to fuse (step 1806). The accuracy level will influence which sensor data is fused and which sensor data is considered an outlier. The process then fuses the selected sensor data to form a single value (step 1808), with the process terminating thereafter. Sensor data is fused by mathematically processing the sensor data to obtain a single value used to determine relative position. The single value may then be shared with multiple vehicles. For example, if a vehicle experiences sensor component failure and requests sensor data from another vehicle, the single value may be shared to aid the vehicle with sensor component failure in determining the relative position of the vehicle.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A vehicle comprising:
a machine controller;
a steering system;
a propulsion system;
a braking system;
a sensor system having a plurality of redundant sensors; and
wherein the machine controller is connected to the steering system, the propulsion system, the braking system; and the sensor system, wherein the machine controller identifies an environment around the vehicle to form an operating environment and selects data from a set of sensors within a plurality of redundant sensors in the sensor system based on the operating environment and sends commands to the steering system, the propulsion system, and the braking system to control movement of the vehicle using sensor data, wherein the machine controller identifies the environment by obtaining the environment around the vehicle from a knowledge base.

2. A vehicle comprising:
a machine controller;
a steering system;
a propulsion system;
a braking system;
a sensor system having a plurality of redundant sensors; and
wherein the machine controller is connected to the steering system, the propulsion system, the braking system; and the sensor system, wherein the machine controller identifies an environment around the vehicle to form an operating environment and selects data from a set of sensors within a plurality of redundant sensors in the sensor system based on the operating environment and sends commands to the steering system, the propulsion system, and the braking system to control movement of the vehicle using sensor data, wherein the machine controller identifies weather conditions associated with the environment around the vehicle to form the operating environment and selects data from the set of sensors in the sensor system based on the weather conditions identified.

3. The vehicle of claim 2, wherein the machine controller identifies the weather conditions associated with the environment by obtaining information regarding weather patterns for a present time in the environment around the vehicle from a knowledge base.

4. The vehicle of claim 2, wherein the machine controller identifies the weather conditions associated with the environment by obtaining data regarding current weather conditions in the environment around the vehicle from one or more of the plurality of redundant sensors on the vehicle.

5. A vehicle comprising:
a machine controller;
a steering system;
a propulsion system;
a braking system;
a sensor system having a plurality of different types of sensors, wherein some types of sensors are more accurate that other types of sensors within the plurality of different types of sensors in a particular environment; and
wherein the machine controller is connected to the steering system, the propulsion system, the braking system; and the sensor system, wherein the machine controller identifies a dynamic condition using the sensor system and sends commands to the steering system, the propulsion system, and the braking system to move the vehicle using sensor data detected by the sensor system, and wherein the machine controller identifies an environment using the plurality of different types of sensors on the vehicle, wherein the machine controller receives data from the plurality of different types of sensors for the vehicle to form received data and generates a thematic map using the received data and a knowledge base.

6. The vehicle of claim 5, wherein the machine controller identifies a location of the vehicle, identifies a map based on the location of the vehicle, and places thematic features into the map using the data received and the knowledge base.

7. The vehicle of claim 6, wherein the machine controller moves the vehicle using the thematic map.

8. The vehicle of claim 5, wherein the knowledge base further comprises an online knowledge base, an a priori knowledge base, and a learned knowledge base.

9. The vehicle of claim 8, wherein the machine controller receives sensor data from the plurality of sensors for the vehicle and applies weights to the sensor data using the online knowledge base to form weighted sensor data.

10. The vehicle of claim 8, wherein the online knowledge base is located at a remote location and accessible to control the vehicle.

11. The vehicle of claim 9, wherein the machine controller selects a portion of the weighted sensor data to form selected sensor data and performs localization using the selected sensor data.

12. The vehicle of claim 11, wherein the machine controller identifies a set of objects in an environment around the vehicle using the selected sensor data and identifies a location of the vehicle using the location of the set of objects.

13. The vehicle of claim 12, wherein the machine controller identifies the set of objects using the sensor data and the knowledge base.

14. The vehicle of claim 12, wherein the knowledge base specifies the set of objects based on the environment.

15. The vehicle of claim 5, wherein the machine controller identifies a set of differences between an environment as detected by the plurality of sensors for the vehicle and a description of the environment in the knowledge base.

16. The vehicle of claim 15, wherein the set of differences comprises at least one of a change in an object in the environment, a new object in the environment, and a missing object from the environment.

17. A vehicle comprising:
a machine controller;
a steering system;
a propulsion system;
a braking system;
a sensor system having a plurality of different types of sensors, wherein some types of sensors are more accurate than other types of sensors within the plurality of different types of sensors in a particular environment; and
wherein the machine controller is connected to the steering system, the propulsion system, the braking system; and the sensor system, wherein the machine controller identifies a dynamic condition using the sensor system and sends commands to the steering system, the propulsion system, and the braking system to move the vehicle using sensor data detected by the sensor system, and wherein the machine controller identifies an environment using the plurality of different types of sensors on the vehicle, wherein the machine controller monitors the plurality of different types of sensors for sensor integrity, wherein the machine controller identifies a fault in at least one sensor in the plurality of different types of sensors.

18. The vehicle of claim 17, wherein the fault in at least one sensor is sensor degradation.

19. The vehicle of claim 17, wherein the fault in at least one sensor is sensor failure.

20. The vehicle of claim 17, wherein the machine controller, responsive to identifying the fault in at least one sensor in the plurality of different types of sensors, generates an alert displaying the fault in at least one sensor in the plurality of different types of sensors.

21. The vehicle of claim 17, wherein the machine controller, responsive to identifying the fault in at least one sensor in the plurality of different types of sensors, selects a different sensor to compensate for the fault in at least one sensor.

22. The vehicle of claim 17, wherein the machine controller, responsive to identifying the fault in at least one sensor in the plurality of different types of sensors, transmits a request for sensor data to a sensor system of another vehicle.

23. The vehicle of claim 22, wherein the machine controller receives the sensor data from the sensor system of another vehicle and performs localization based on the sensor data from the sensor system of another vehicle.

24. A vehicle comprising:
a machine controller;
a steering system;
a propulsion system;
a braking system;
a sensor system; and
a knowledge base used by the machine controller, wherein the machine controller is connected to the steering system, the propulsion system, the braking system, and the sensor system; and
wherein the machine controller identifies an environment using a plurality of sensors on the vehicle, wherein the plurality of sensors comprises at least one of a global positioning system, structured light sensor, two dimensional/three dimensional lidar, dead reckoning, far and medium infrared camera, visible light camera, radar, ultrasonic sonar, and radio frequency identification reader; identifies a location of the vehicle; identifies a map based on the location of the vehicle; identifies a set of objects in the environment using data received from the plurality of sensors and a knowledge base, wherein the knowledge base specifies the set of objects based on the environment; places thematic features into the map using the set of objects identified and the map identified; controls the vehicle using the knowledge base, wherein the knowledge base further comprises an online knowledge base, an a priori knowledge base, and a learned knowledge base; monitors the plurality of sensors for sensor integrity; identifies a fault in at least one sensor in the plurality of sensors, wherein the fault in at least one sensor is one of sensor degradation and sensor failure; and responsive to identifying a fault in at least one sensor in the plurality of sensors, generates an alert displaying the fault in at least one sensor in the plurality of sensors, selects a different sensor to compensate for the fault in at least one sensor, transmits a request for sensor data to a sensor system of another vehicle, receives the sensor data from the sensor system of another vehicle, and performs localization based on the sensor data from the sensor system of another vehicle.

* * * * *